United States Patent [19]
Tokui et al.

[11] Patent Number: 5,648,155
[45] Date of Patent: Jul. 15, 1997

[54] MAGNETIC RECORDING MEDIUM

[75] Inventors: Kenji Tokui; Yoshiteru Matsubayashi; Masashi Yoshikawa; Jyunji Oshita, all of Mito; Yuji Ohata, Yamato, all of Japan

[73] Assignee: Victor Company of Japan, Ltd., Yokohama, Japan

[21] Appl. No.: 389,318

[22] Filed: Feb. 16, 1995

Related U.S. Application Data

[63] Continuation-in-part of Ser. No. 23,207, Feb. 25, 1993, abandoned.

[51] Int. Cl.$^6$ ............................. G11B 5/66; B32B 5/16
[52] U.S. Cl. .................. 428/323; 428/328; 428/329; 428/694 B; 428/694 BS; 428/694 BR; 428/694 BA; 428/694 BH; 428/900
[58] Field of Search .................. 428/694 B, 694 BS, 428/694 BR, 694 BA, 694 BH, 900, 323, 328, 329

[56] References Cited

U.S. PATENT DOCUMENTS

| | | | |
|---|---|---|---|
| 4,442,159 | 4/1984 | Dezawa | 428/212 |
| 4,911,951 | 3/1990 | Ogawa | 427/130 |
| 4,965,120 | 10/1990 | Ono | 428/213 |

FOREIGN PATENT DOCUMENTS 6-40383  5/1994  Japan.

*Primary Examiner*—Leszek Kiliman
*Attorney, Agent, or Firm*—Michael N. Meller

[57] ABSTRACT

The present invention provides a thin magnetic tape for allowing a long play without degrading electro-magnetic transfer characteristics and mechanical strength of the magnetic tape. The magnetic tape comprises a base film, an an under layer provided on the base film, and a magnetic layer containing magnetic particles coated on the under layer. The under layer contains magnetic plate-particles each having a configuration such that a ratio of a major axis to a minor axis observed in a plate-like surface is preferred to be approximately 1 and a ratio of the major axis to a thickness off the magnetic particles is to be 5~10 so that the under layer has Young's modulus of not less than $2.0 \times 10^{10}$ N/m$^2$ in a longitudinal direction of the magnetic tape and has virtually the same value in a traversing direction thereof. The magnetic plate-particles have an easy axis of magnetization in a longitudinal direction of the magnetic tape to improve the electro-magnetic transfer characteristics and mechanical strength thereof by forming magnetic flux coupling between the magnetic plate-particles in the under layer and the magnetic particles in the magnetic layer.

11 Claims, 2 Drawing Sheets

MAGNETIC RECORDING MEDIUM

BACKGROUND OF THE INVENTION

Field of the Invention

The present invention is a Continuation-In-Part Application of U.S. Ser. No. 023,207 filed on Feb. 25, 1993, now abandoned and relates to improvements of a magnetic recording medium used for a magnetic recording and/or reproducing apparatuses such as video tape recorders and digital audio tape recorders, and it particularly relates to a coated-type magnetic, recording medium having a base film on which an under layer containing magnetic particles having magnetic charges and a magnetic layer are laminated in this order.

Description of the Related Arts

Presently, a magnetic recording medium such as a magnetic tape is constructed by coating a magnetic paint on one side of a base film to form a magnetic layer on which signals are recorded by magnetic, heads.

As well known, many kinds of recording formats are established in the industries depending on different recording objects, for instance, sound, pictures and data to be recorded on the magnetic tapes.

Therefore, in accordance with the various kinds of formats, there are a variety of demands for improving the magnetic tapes, for instance, a demand for improving a magnetic tape to have a high S/N ratio, a high recording density, a high output and a demand for a magnetic tape capable of a long play. Further, it is predictable that the level of demands for the magnetic tape expected to be proposed in future will be higher than ever, thus the magnetic tapes will need to be improved to meet such elevated demands.

As measures for realizing high electro-magnetic transfer characteristics such as a high S/N ratio, a high recording density and a high signal output characteristic, improvements of magnetostatic characteristics and physically smoothing a magnetic layer of the magnetic tape have been conducted so far. In order to improve the magnetostatic characteristics of the magnetic tape, it is necessary to improve magnetic powder itself and to increase a packing density of the magnetic particles contained in the magnetic layer. In order to increase the play time of the magnetic tape, a thickness of the magnetic tape has been reduced to date so that an area of the magnetic layer per unit volume of the magnetic tape is enlarged.

However, since the improvement of the magnetic characteristic of magnetic particles themselves is approaching its limit, thus, it seems to be impossible to expect an outstanding improvement thereof. Further, taking account of the practical use of the magnetic tape, the increase of packing density of the magnetic particles in the magnetic layer is not an effective measure because it degrades durability of the magnetic layer. Furthermore, taking account off the practical use of the magnetic tape, smoothing a surface of the magnetic layer is not an effective measure because it degrades a transporting characteristic of the magnetic tape.

On the other hand, reduction of thickness of the magnetic tape substantially degrades a mechanical strength of the magnetic tape, which also causes other degradations such as a contact characteristic between a magnetic head and the magnetic layer, a tape running characteristic, durability of the magnetic tape, etc. As a countermeasure to these problems, it is proposed to provide an under layer having an adequate mechanical strength on the base film to increase the mechanical strength of the magnetic tape, however, this countermeasure does not meet the demand enough. Further, as well known, reducing the thickness of the magnetic layer of the magnetic tape develops a decrease of output of low frequency signals recorded in an inner portion of the magnetic layer, and an increase of light transmittance as well. The latter poses a problem of decreasing a light blocking effect which is applied to detection of tape ends of the magnetic tape, for instance, in the VHS (one of the industrial standard systems) format. As a countermeasure to this problem, a back coating layer is provided on the opposite surface of the magnetic layer, which poses problems off preventing reduction of thickness of the magnetic tape and inviting a low productivity of the magnetic tape.

SUMMARY OF THE INVENTION

Accordingly, a general object of the present invention is to provide a magnetic recording medium in which the above disadvantages have been eliminated.

A more specific object of the present invention is to provide a magnetic recording medium suitable for a long play by reducing the thickness of the magnetic tape without degrading electro-magnetic transfer characteristics and a mechanical strength of the magnetic tape.

Another and more specific object of the present invention is to provide a magnetic recording medium used for a magnetic recording and/or reproducing apparatus comprising, a non-magnetic substrate, an under layer provided on the non-magnetic substrate, said under layer containing magnetic plate-particles therein, each of said magnetic plate-particles having at least a plate-like surface and a thickness defined from said plate-like surface and having an easy axis of magnetization parallel to said plate-like surface, said plate-like surface having a major axis defined as a first distance vector having a maximum dimension between a pair of parallel tangential each contacting at an outer circumference of said plate-like surface and a minor axis defined as a second distance vector having a minimum dimension between a pair of tangential lines each contacting at said outer circumference thereof so as to enhance mechanical strength of the magnetic recording medium in both traversing and longitudinal directions of said magnetic recording medium, said thickness from said plate-like surface being smaller than a length of the minor axis, said under layer having a Young's modulus of not less than $2.0 \times 10^{10}$ $N/m^2$ in a longitudinal direction of said magnetic recording medium and having a coercive force "Hcs" as defined in an inequality (1) to enhance electro-magnetic transfer characteristics of the magnetic recording medium, $$1.5 \times 10^4 A/m < Hcs < 8.0 \times 10^4 A/m \tag{1}$$

and, a magnetic layer provided on said under layer for recording signal information, said magnetic layer containing magnetic acicular particles each having an easy axis of magnetization in a longitudinal direction thereof, wherein each of said magnetic plate-particles and said magnetic acicular particles is disposed in said under layer and magnetic layer, respectively, in such a manner that each of said magnetic plate-particles and magnetic acicular particles has an easy axis of magnetization oriented in a longitudinal direction of said magnetic recording medium so as to form magnetic flux coupling therebetween.

Another specific object of the present invention is to provide a magnetic recording reed lure used for a magnetic recording and/or reproducing apparatus comprising, a non-magnetic substrate, an under layer provided on the non-magnetic substrate, said under layer containing magnetic plate-particles therein, each of said magnetic plate-particles having at least a plate-like surface and a thickness defined from said plate-like surface and having an easy axis of magnetization parallel to said plate-like surface, said plate-like surface having a major axis defined as a first distance vector having a maximum dimension between a pair of parallel tangential lines each contacting at an outer circumference of the plate-like surface and a minor axis defined as a second distance vector having a minimum dimension between a pair of tangential lines each circumscribed at said outer circumference thereof so as to enhance mechanical strength of the magnetic recording medium in both traversing and longitudinal directions of said magnetic recording medium, said thickness from said plate-like surface being smaller than a length of the minor axis, said under layer having a Young's modulus of not less than $2.0 \times 10^{10}$ N/m$^2$ in a longitudinal direction of said magnetic recording medium and having a coercive force "Hcs", and a magnetic layer provided on said under layer for recording signal information, said magnetic layer containing magnetic acicular particles each having an easy axis of magnetization in a longitudinal direction thereof, said magnetic layer having a coercive force "Hcj", wherein each of said magnetic plate-particles and said magnetic acicular particles is disposed in said under layer and said magnetic layer, respectively, in such a manner that each of said magnetic plate-particles and magnetic acicular particles has an easy axis of magnetization oriented in a longitudinal direction of said magnetic recording medium so as to form magnetic flux coupling therebetween and said coercive force "Hcj" of the magnetic layer is larger than said coercive force "Hcs" of the under layer so as to enhance electro-magnetic transfer characteristics of the magnetic recording medium.

Another specific object of the present invention is to provide a magnetic recording medium used for a magnetic recording and/or reproducing apparatus comprising, a non-magnetic substrate, an under layer provided on the non-magnetic substrate, said under layer containing magnetic plate-particles therein, each of said magnetic plate-particles having at least a plate-like surface and a thickness defined from said plate-like surface and having an easy axis of magnetization parallel to said plate-like surface, said plate-like surface having a major axis defined as a first distance vector having a maximum dimension between a pair of parallel tangential lines each contacting at an outer circumference of the plate-like surface and a minor axis defined as a second distance vector having a minimum dimension between a pair of tangential lines each contacting at said outer circumference thereof so as to enhance mechanical strength of the magnetic recording medium in both traversing and longitudinal directions of said magnetic recording medium, said thickness from said plate-like surface being smaller than a length of the minor axis, said under layer having a Young's modulus of not less than $2.0 \times 10^{10}$ N/m$^2$ in a longitudinal direction of said magnetic recording medium, and a magnetic layer provided on said under layer for recording signal information, said magnetic layer containing magnetic hexagonal plate-particles, wherein each of said magnetic plate-particles is disposed in said under layer in such a manner that each of said magnetic plate-particles particles has an easy axis of magnetization oriented in a longitudinal direction of said magnetic recording medium.

Other objects and further features of the present invention will be apparent from the following detailed description when read in conjunction with the accompanying drawings.

BRIEF DESCRIPTION OF THE DRAWINGS

Preferred embodiments of the present invention will be described with reference to the accompanying drawings where in.

DETAILED DESCRIPTION OF THE PREFERRED EMBODIMENT

Prior to a description of embodiments of the present invention, a description is given to an outline of the present invention.

Figure 1:
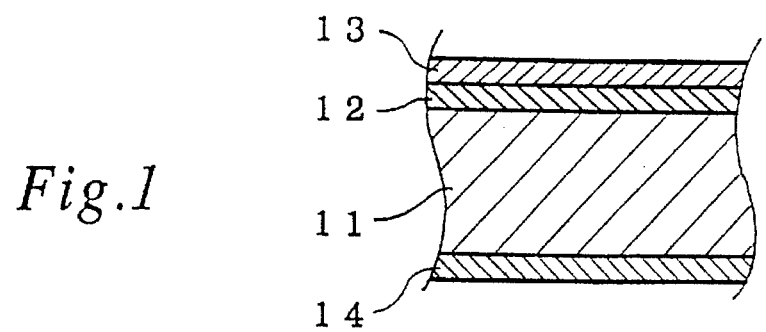
FIG. 1 is a sectional view showing a magnetic tape of the present invention.
Figure 3:
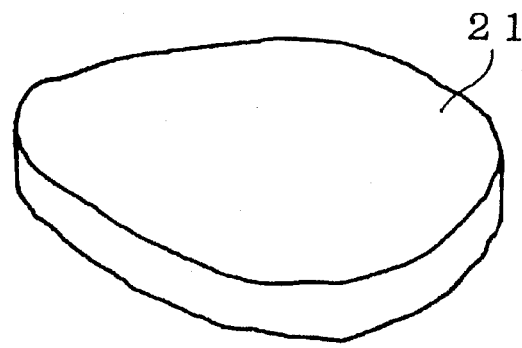
FIG. 3(a) is a perspective view of a single plate-like particle contained in the under layer in the present invention.
FIG. 3(b) is a plan view of the single plate-like particle shown in FIG. 3(a)
FIG. 3(c) is a side view of the single plate-like particles shown in FIG. 3(a).
Figure 3:
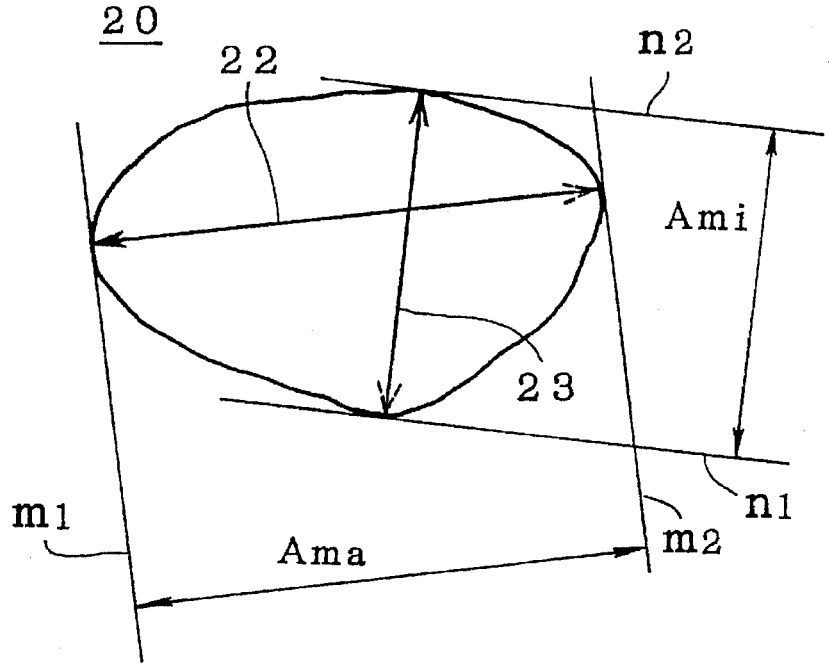
Figure 3:

FIG. 1 is a sectional view of showing a magnetic tape of the present invention and FIG. 3(a) is a perspective view of a single plate-like particle contained in the under layer in the present invention and FIG. 3(b) is a plan view of the single plate-like particle shown in FIG. 3(a) and FIG. 3(c) is a side view of the single plate-like particles shown in FIG. 3(a).

Referring to FIG. 1, a magnetic tape 10 of the present invention has an under layer 12 which is interposed between a base film 11 made of non-magnetic material and a magnetic layer 13 on which signal information is recorded. A reference character 14 designates a back coating layer, which is used if necessary.

In the present invention, the under layer 12 contains the magnetic plate-particles each having a configuration such that a ratio of a major axis to a minor axis observed in a plane of each of magnetic plate-particles is preferably chosen to be approximately 1 and a ratio of the major axis to a thickness of the magnetic plate-particles is chosen to be 5~10.

Specifically, a typical single magnetic plate-particle 20 contained in the under layer 12 is shown in FIGS. 3(a), 3(b) and 3(c).

The single magnetic plate-particle 20 generally has a plate-like shape and has at least a plate-like surface 21. The plate-like surface 21 has a major axis 22, of which a length is "Ama", and a minor axis 23, of which a length is "Ami" as shown in FIG. 3(b).

The major axis 22 and the minor axis 23 of the single plate particle 20 in the present invention is defined as follows:

In FIG. 3(b), tangential lines m1 and m2 are parallel to each other and tangential lines n1 and n2 are also parallel to each other. Each of these tangential lines m1, m2, n1 and n2 are circumscribed at the outer circumference of the plate-like surface 21. The major axis 22 is defined as a distance vector having a maximum length "Ama" which is a distance between the tangential lines m1 and m2 parallel to each other. The minor axis 23 is defined as a distance vector having a minimum length "Ami" which is a distance between the tangential lines n1 and n2 parallel to each other. Thus, it should be noted that the major axis 22 does not always intersect perpendicularly to the minor axis 23.

In practice, the magnetic plate-particles used for the under layer 12 have various kinds of geometrical configurations. Thus, in the present invention, an average major axis and an average minor axis of the plate-particles are respectively defined as a standard for adoptable magnetic plate-particles as follows:

The average major axis "$\overline{Ama}$" is defined as an average value off the maximum lengths "Ama" of the magnetic plate-particles in bulk to be used, and the average minor axis "$\overline{Ami}$" is defined as an average value of the minimum lengths "Ami" of the magnetic plate-particles in bulk to be used in the present invention.

Further, the single magnetic plate-particle 20 has a thickness "Th" defined From the plate-like surface 21 and an average thickness "$\overline{Th}$" is also defined as an average value of the thickness "Th" with respect to the magnetic plate-particles to be used.

The above average major and minor axes "$\overline{Ama}$" and "$\overline{Ami}$" and the average thickness "$\overline{Th}$" are measured as follows:

The magnetic plate-particles adequately dispersed are adopted as a sample for the measurement. The lengths "Ama" and "Ami" of the major and minor axes 22, 23 and the thickness "Th" of the single magnetic plate-particle 20 are measured on every magnetic plate-particle in the sample by being observed under the SEM (scanning electron microscope) in such a manner as mentioned in the foregoing together with FIGS. 3(a)-3(c).

In the present invention, there are employed the magnetic plate-particles for the under layer 12 having a ratio of the average major axis "$\overline{Ama}$" to the average minor axis "$\overline{Ami}$" within the plate-like surface 21 and a ratio of the average major axis "$\overline{Ama}$" to the average thickness "$\overline{Th}$" defined as follows:

$$\overline{Ama}/\overline{Ami}=1\sim 1.5 \quad (1)$$

$$\overline{Ama}/\overline{Th}=5\sim 10 \quad (2)$$

Further, the single magnetic plate-particle 20 in the under layer 12 has an easy axis magnetization which is substantially parallel to the plate-like surface 21 and its direction accords with a direction off the major axis 22 on the plate-like surface 21 due to a shape anisotropy thereof.

Upon coating the under layer 12 on the base film 11, a magnetic field is applied to the under layer 12 in a longitudinal direction of the magnetic tape 10 (in a direction of a tape transport direction), thus each of the magnetic plate-particles is disposed in the under layer 12 in such a manner that each easy axis of magnetization of the single magnetic plate-particle 20 is oriented in the longitudinal direction off the magnetic tape 10 and the plate-like surface 21 thereof is securely disposed to be parallel to the surface of the base film 11 in the under layer 12.

Since the ratio Ama/Ami of the single magnetic plate-particle 20 is preferably chosen to be approximately 1 and the plate-like surface 21 thereof is securely disposed to be parallel to the base film 11 in the under layer 12, the mechanical strengths (Young's moduluslsi) of the under layer 12 both in the longitudinal direction and in a traversing direction of the magnetic tape 10 have substantially almost the same value each other. Therefore, it is possible to enhance the mechanical strength of the magnetic tape 10 not only in the longitudinal direction but also in the traversing direction thereof, this is especially effective to improve a head-tape contact characteristic and a tape running characteristic because the magnetic tape 10 is prevented from being curved easily in the direction of a magnetic tape width like as a transverse cupping.

Thus, according to the present invention, it is possible to obtain a magnetic tape from which such an excellent electro-magnetic transfer characteristic as the magnetic tape can virtually be derived at its maximum.

Further, since easy axes of magnetization of acicular magnetic particles adopted in the magnetic layer 13 are oriented in the longitudinal direction as well as the magnetic plate-particles in the under layer 12, magnetic flux couplings are easily formed between these particles, which improve electro-magnetic transfer characteristics of the magnetic tape 10, especially with respect to lower frequency signals which are recorded into a deeper portion of the magnetic layer 13.

This is true in a case where hexagonal plate particles are employed as the magnetic particles in the magnetic layer 13. Such a hexagonal plate particle has at least a plate-like surface and its easy axis of magnetization is perpendicular to the plate-like surface as will be described hereinafter.

Next a description is given to each of embodiments 1 through 8 according to the present invention together with comparatives 1 through 18, respectively.

[Embodiments 1, 7 and 8 ]

Referring to FIG. 1, in the embodiment 1 of the present invention, at first, an under layer 12 containing magnetic plate-particles (powder) such as iron carbide particles is provided on the base film 11, then, the magnetic layer 13 containing magnetic particles such as $\gamma$-$Fe_2O_3$ particles is provided on the under layer 12 so as to enhance the mechanical strength of the magnetic tape, 10 not only in a longitudinal direction but also in a traversing direction as mentioned in the foregoing. The respective magnetic plate-particles of the under layer 12 have easy axes of magnetization in the longitudinal direction.

Such mechanical reinforcement of the magnetic, tape 10 improves the durability and the contact characteristics of a magnetic head with respect to the magnetic tape 10, which realizes the improvement of the electro-magnetic transfer characteristic as well.

When the strength of the magnetic tape 10 increases, it is capable of reducing the thickness of the magnetic tape 10, thus it realizes the long play of the magnetic tape 10. Further, the employment of magnetic plate-particles having easy axes of magnetization in a longitudinal direction in the under layer 12 improves the electro-magnetic transfer characteristics such as output characteristic of low frequency signals recorded in an inner portion of the magnetic layer 13.

We, inventors of the present invention, have found an optimum condition of a coercive force Hcs of the under layer 12 for obtaining excellent electro-magnetic transfer characteristics of the magnetic tape 10 in the case of employing $\gamma$-$Fe_2O_3$ particles in the magnetic layer 13 through our experiments as follows:

$$1.5\times 10^4 A/m < Hcs < 8.0\times 10^4 A/m \quad (1)$$

An optimum condition of Young's modulus of the under layer 12 in the longitudinal direction has been also found from the result of experiments made by the inventors, taking account of the durability and the contact characteristic between the magnetic head (not shown) and the magnetic tape 10 as follows:

$$Young's\ m. \geq 2.0\times 10^{10} N/m^2 \quad (2)$$

Next, the detailed description is given to the embodiments 1, 7, 8 and the comparatives 1 through 5.

The compositions of the magnetic paint for the magnetic layer 13 and the under layer paint for the under layer 12 of the embodiments 1, 7 and 8 of the present invention are respectively shown in Table 1, 26, 27 and those of comparatives 1 through 5 are shown in Tables 2 through 6.

TABLE 1

Embodiment 1

| magnetic paint (W. P.*) | | under layer paint (W. P.*) | |
|---|---|---|---|
| $\gamma$-$Fe_2O_3$ | 300 | iron carbide** | 300 |
| vinyl chloride | 50 | vinyl chloride | 50 |
| polyurethane resin | 50 | polyurethane resin | 50 |
| $Cr_2O_3$ | 10 | toluene | 250 |
| soybean lecithin | 1 | methyl ethyl ketone | 250 |
| toluene | 250 | isocyanate resin | 15 |
| methyl ethyl ketone | 250 | thickness | 1.0 μm |
| isocyanate resin | 20 | coercive force | $2.0 \times 10^4$ A/m |
| thickness | 2.0 μm | | |

*W. P. (Weight Parts)
**plate powder
Note:
thickness of back coating layer is 0.5 μm

TABLE 2

Comparative 1

| magnetic paint (W. P.*) | | under layer paint | |
|---|---|---|---|
| $\gamma$-$Fe_2O_3$ | 300 | none | |
| vinyl chloride | 50 | | |
| polyurethane resin | 50 | | |
| $Cr_2O_3$ | 10 | | |
| soybean lecithin | 1 | | |
| toluene | 250 | | |
| methyl ethyl ketone | 250 | | |
| isocyanate resin | 20 | | |
| thickness | 3.0 μm | | |

*W. P. (Weight Parts)
Note:
thickness of the back coating layer is 0.5 μm

TABLE 3

Comparative 2

| magnetic paint (W. P.*) | | under layer paint (W. P.*) | |
|---|---|---|---|
| $\gamma$-$Fe_2O_3$ | 300 | iron carbide** | 300 |
| vinyl chloride | 50 | vinyl chloride | 50 |
| polyurethane resin | 50 | polyurethane resin | 50 |
| $Cr_2O_3$ | 10 | toluene | 250 |
| soybean lecithin | 1 | methyl ethyl ketone | 250 |
| toluene | 250 | isocyanate resin | 15 |
| methyl ethyl ketone | 250 | thickness | 1.0 μm |
| isocyanate resin | 20 | coercive force | $8.0 \times 10^3$ A/m |
| thickness | 2.0 μm | | |

*W. P. (Weight Parts)
**plate powder
Note:
thickness of the back coating layer is 0.5 μm

TABLE 4

Comparative 3

| magnetic paint (W. P.*) | | under layer paint (W. P.*) | |
|---|---|---|---|
| $\gamma$-$Fe_2O_3$ | 300 | iron carbide** | 300 |
| vinyl chloride | 50 | vinyl chloride | 50 |
| polyurethane resin | 50 | polyurethane resin | 50 |
| $Cr_2O_3$ | 10 | toluene | 250 |
| soybean lecithin | 1 | methyl ethyl ketone | 250 |
| toluene | 250 | isocyanate resin | 15 |

TABLE 4-continued

Comparative 3

| magnetic paint (W. P.*) | | under layer paint (W. P.*) | |
|---|---|---|---|
| methyl ethyl ketone | 250 | thickness | 1.0 μm |
| isocyanate resin | 20 | coercive force | $1.0 \times 10^5$ A/m |
| thickness | 2.0 μm | | |

*W. P. (Weight Parts)
**plate powder
Note:
thickness of the back coating layer is 0.5 μm

TABLE 5

Comparative 4

| magnetic paint (W. P.*) | | under layer paint (W. P.*) | |
|---|---|---|---|
| $\gamma$-$Fe_2O_3$ | 300 | alumina** | 300 |
| vinyl chloride | 50 | vinyl chloride | 50 |
| polyurethane resin | 50 | polyurethane resin | 50 |
| $Cr_2O_3$ | 10 | toluene | 250 |
| soybean lecithin | 1 | methyl ethyl ketone | 250 |
| toluene | 250 | isocyanate resin | 15 |
| methyl ethyl ketone | 250 | thickness | 1.0 μm |
| isocyanate resin | 20 | | |
| thickness | 2.0 μm | | |

*W. P. (Weight Parts)
**plate powder
Note:
thickness of the back coating layer is 0.5 μm

TABLE 6

Comparative 5

| magnetic paint (W. P.*) | | under layer paint (W. P.*) | |
|---|---|---|---|
| $\gamma$-$Fe_2O_3$ | 300 | iron carbide** | 300 |
| vinyl chloride | 50 | vinyl chloride | 50 |
| polyurethane resin | 50 | polyurethane resin | 50 |
| $Cr_2O_3$ | 10 | toluene | 250 |
| soybean lecithin | 1 | methyl ethyl ketone | 250 |
| toluene | 250 | isocyanate resin | 15 |
| methyl ethyl ketone | 250 | thickness | 1.0 μm |
| isocyanate resin | 20 | coercive force | $2.0 \times 10^4$ A/m |
| thickness | 2.0 μm | | |

*W. P. (Weight Parts)
**acicular powder
Note:
thickness of the back coating layer is 0.5 μm

TABLE 26

Embodiment 7

| magnetic paint (W. P.*) | | under layer paint (W. P.*) | |
|---|---|---|---|
| $\gamma$-$Fe_2O_3$ | 300 | iron carbide** | 300 |
| vinyl chloride | 50 | vinyl chloride | 50 |
| polyurethane resin | 50 | polyurethane resin | 50 |
| $Cr_2O_3$ | 10 | toluene | 250 |
| soybean lecithin | 1 | methyl ethyl ketone | 250 |
| toluene | 250 | isocyanate resin | 15 |
| methyl ethyl ketone | 250 | thickness | 1.0 μm |
| isocyanate resin | 20 | coercive force | $1.7 \times 10^4$ A/m |
| thickness | 2.0 μm | | |

*W. P. (Weight Parts)
**plate powder
Note:
thickness of back coating layer is 0.5 μm

TABLE 27

Embodiment 8

| magnetic paint (W. P.*) | | under layer paint (W. P.*) | |
|---|---|---|---|
| γ-Fe$_2$O$_3$ | 300 | iron carbide** | 300 |
| vinyl chloride | 50 | vinyl chloride | 50 |
| polyurethane resin | 50 | polyurethane resin | 50 |
| Cr$_2$O$_3$ | 10 | toluene | 250 |
| soybean lecithin | 1 | methyl ethyl ketone | 250 |
| toluene | 250 | isocyanate resin | 15 |
| methyl ethyl ketone | 250 | thickness | 1.0 μm |
| isocyanate resin | 20 | coercive force | 7.6 × 10$^4$ A/m |
| thickness | 2.0 μm | | |

*W. P. (Weight Parts)
**plate powder
Note:
thickness of the back coating layer is 0.5 μm The magnetic tape 10 of the embodiment 1 was constructed in such manners that the under layer 12 was provided by coating the under layer paint as shown in Table 1 on one surface of the wide base film (11) of a PET (polyethylene terephthalate) film having a thickness of 10 μm and the magnetic layer 13 was provided on the under layer 12 by coating the magnetic paint as shown in Table 1. After the back coating layer 14 was provided on another surface of the base film 11 by coating the back coating paint, the magnetic tape 10 was obtained through a drying process, a calendering process, a curing process and a slitting process where the wide base film was slit to obtain a strip of VHS type video tape having a width off ½ inch. The thickness of the back coating layer 14 was determined to be 0.5 μm and the overall thickness of the magnetic tape 10 was determined to be 13.5 μm.

The embodiments 7 through 8 and comparatives 1 through 5 mentioned in the foregoing were produced in the similar manner to the one for embodiment 1, so that description is omitted for simplicity.

Table 7 shows conditions imposed on the magnetic tape 10 as mentioned in the foregoing, and results of the evaluation tests of the embodiments 1, 7, 8 and the comparatives 1 through 5 as follows:

Condition 1 (condit. 1) in Table 7

The condition 1 (condit. 1) shows Young's modulus (Y. M.) of the under layer 12 in the longitudinal direction of the magnetic tape 10. Among them, the one which is not less than 2.0×10$^{10}$ N/m$^2$ satisfies the condition 1 of the Young's modulus of the present invention as described hereinafter.

Condition 2 (condit. 2) in Table 7

The condition 2 (condit. 2) shows coercive force Hcs of the under layer. Among them, the under layer of which Hcs is 1.5×10$^4$ A/m<Hcs<8.0×10$^4$ A/m satisfies the condition 2 of the coercive force in the present invention as described hereinafter.

The evaluation tests of the magnetic tape 10 were conducted by using a 4-step scale with symbols of ⊙, o, Δ, and × for such evaluation test items as S/N of chrominance signal (C-S/N) converted to a low frequency band as an electro-magnetic transfer characteristic, a running characteristic (running char.), stiffness (stif.) and a contact characteristic (cont. char.) between a magnetic head and a magnetic tape 10 of the respective embodiment 1, 7, 8 and the comparatives 1 through 5.

The evaluation tests of the contact characteristic were conducted by observing envelopes of reproduced output signals.

The evaluation tests of the running characteristic were conducted by measuring kinetic friction coefficient (k. fr.) μk of the magnetic tapes 10 and observing edge damages of the magnetic tapes 10 after 100 repeated passes.

As a substitutive characteristic of the mechanical strength of the magnetic tape 10, a stiffness (stif.) of the magnetic tape 10 was measured and evaluated.

TABLE 7

| | condit. 1 Young. m. ×10$^{10}$ (N/m$^2$) | condit. 2 coercive force ×10$^4$ (A/m) | evaluation tests | | | | |
|---|---|---|---|---|---|---|---|
| | | | | running char. | | | |
| | | | C-S/N (dB) | k. fr. μK | edge damage | stif. (mg) | cont. char. |
| emb. 1 | 3.0 | 2.0 | +1.0 | 0.35 | ⊙ | 180 | ⊙ |
| emb. 7 | 2.8 | 1.7 | +1.4 | 0.33 | ⊙ | 179 | ⊙ |
| emb. 8 | 3.0 | 7.6 | +1.1 | 0.31 | ⊙ | 181 | ⊙ |
| com. 1 | none | none | −6.0 | 0.47 | x | 100 | x |
| com. 2 | 3.1 | 0.8 | +0.5 | 0.32 | o | 175 | ⊙ |
| com. 3 | 3.0 | 10.0 | −1.0 | 0.36 | o | 170 | ⊙ |
| com. 4 | 2.8 | none | −4.0 | 0.40 | Δ | 176 | o |
| com. 5 | 2.5 | 2.0 | +0.3 | 0.35 | o | 150 | Δ |

Symbol used in Table 7 denote as follows:
⊙ ... good
Δ ... poor
o ... fairly good
× ... very poor As is clear from Table 7, the embodiments 1, 7 and 8 (emb. 1, emb. 7 and emb. 8) show generally good results in all the evaluation test items. The comparative 1 (com. 1) having no under layer 12 shows the worst result in all the evaluation test items. The comparative 2 (cont. 2) shows a good result in the contact characteristic and a rather good result in running characteristics, however, it shows a lower C-S/N than those of the embodiments 1, 7 and 8. This reason is considered that the coercive force "Hcs" of 0.8×10$^4$ A/m of the under layer 12 is too small. On the contrary, the comparative 3 (com. 3) shows a lower C-S/N. This reason is considered that the coercive force "Hcs" of 10×10$^4$ A/M of the under layer 12 is too large. The comparative 4 shows a rather good result of the stiffness characteristic, however, it shows a lower C-S/N than those of the embodiments 1, 7 and 8 and a worse running characteristic than those of the embodiment 1 because the comparative 4 has no magnetic charge in the under layer 12. The comparative 5 shows a rather higher value of C-S/N characteristic, however, it shows a lower stiffness as its mechanical strength is smaller than those of the embodiments 1, 7 and 8 because acicular magnetic particles (iron carbide) are employed in the under layer 12 instead of the magnetic plate-particles used in the embodiments 1, 7 and 8.

From the foregoing, it can be said that all the magnetic tapes 10 having the under layers 12 containing the plate-like particles 20 and having a Young's modulus of not less than 2.5×10$^{10}$ N/m$^2$ show good results in the tape running characteristic, the stiffness and the head-tape contact characteristic as mechanical characteristics.

Further, it will be understood that it is preferable to employ the under layer 12 containing plate-like particles 20 and having the coercive force tics which satisfies a range of 1.5×10$^4$ A/m<Hcs<8.0×10$^4$ A/m so as to enhance the electro-magnetic transfer characteristics.

According to the embodiments 1, 7 and 8 of the present invention, it is possible to obtain a thin magnetic tape having excellent electro-magnetic transfer and running characteristics by limiting the Young's modulus and a range of the coercive force of the under layer.

[Embodiments 2 and 6]

Next, a description is given to embodiments 2 and 6.

As mentioned for the prior art, it is desirable not to provide the back coating layer 14 on the opposite surface of the magnetic layer 13, taking account of thickness of the magnetic tape 10 for a long play.

We, inventors of the present invention, have confirmed through our experiments that the magnetic tapes having a light transmittance less than 0.8 show light blocking effects good enough to be used, for instance, in the VHS magnetic tapes, without employing the back coating layer 14. Further, according to the present invention, the inventors have discovered an optimum condition of the magnetic layer 13 for preventing the magnetic layer 13 from contamination, which causes a dropout in the output signal in operation. The optimum condition for preventing the magnetic layer 13 front getting contaminated is that the resistivity of the magnetic layer 13 is no more than $3.0 \times 10^7 \Omega \cdot mm$.

In order to obtain the magnetic tape satisfying the above two conditions (i.e., the light transmittance of the magnetic tape 10 and the resistivity of the magnetic layer 13) without degrading the running characteristic, the electro-magnetic transfer characteristics and the mechanical strength off the magnetic tape 10, the inventors have now discovered to employ magnetic particles as magnetic particles in the magnetic layer 13 and magnetic plate-particles (plate powder) such as of $\alpha$-$Fe_2O_3$ in the under layer 12.

Further, it is verified by the inventors that the coercive force Hcj of the magnetic layer 13 has to be higher than that of the coercive force lies of the under layer 12, and any type of magnetic plate-particles can be employed in the under layer 12 if the magnetic plate-particles have easy axes of magnetization in a longitudinal direction of the magnetic tape, in order to obtain an excellent electro-magnetic transfer characteristic.

TABLE 8

Embodiment 2

| magnetic paint (W. P.*) | | under layer paint (W. P.*) | |
|---|---|---|---|
| magnetite powder | 300 | $\alpha$-$Fe_2O_3$** | 300 |
| polyvinyl butyral | 40 | polyvinyl butyral | 20 |
| polyurethane resin | 40 | polyurethane resin | 20 |
| $Cr_2O_3$ | 10 | toluene | 200 |
| palmitic acid | 3 | methyl ethyl ketone | 300 |
| toluene | 300 | thickness | 1.0 µm |
| methyl ethyl ketone | 300 | coercive force | $2.6 \times 10^4$ A/m |
| thickness | 2.0 µm | | |
| coercive force | $5.0 \times 10^4$ A/m | | |

*W. P. (Weight Parts)
**plate powder
Note:
no back coating layer is provided

Table 8 shows compositions of the magnetic paint for the magnetic layer 13 and the under layer paint for the under layer 12 of the embodiment 2 of the present invention.

The magnetic tape 10 of the embodiment 2 was constructed as shown in FIG. 1 except For the back coating layer 14 which was not provided in this embodiment, in such a manner that the under layer 12 was provided by coating the under layer paint as shown in Table 8 on one surface of the wide base film (11) of a PET (polyethylene terephthalate) film having thickness of 10 µm and the magnetic layer 13 was provided on the under layer 12 by coating the magnetic paint as shown in Table 8. The magnetic tape 10 was obtained through a drying process, a calendering process, a curing process and a slitting process where the wide base film was slit to obtain the VHS type video tape having a width of ½ inch. The overall thickness of the magnetic tape 10 of this embodiment 2 was determined to be 13.0 µm which was thinner by 0.5 µm than that of the embodiments 1.

The magnetic tapes 10 of an embodiment 6 and comparatives 7 and 8 were respectively produced so as to have different values of Young's modulus for the under layers 12 as shown in Table 9 by changing weight ratios of polyvinyl butyral and polyurethane resin in the under layer paint of Table 8. No back coat layer 14 was provided on each of the magnetic tapes 10 of the embodiment 6 and comparative 7 and 8.

TABLE 9

| | Young. mod. of under layer ($10^{10}$ N/m²) | evaluation tests | |
|---|---|---|---|
| | | contact char. | durability |
| emb. 2 | 3.2 | o | o |
| emb. 6 | 2.1 | o | o |
| com. 7 | 1.7 | Δ | x |
| com. 8 | 1.1 | x | x |

As to the contact and the durability characteristics of the magnetic tapes 10 of the embodiments 2, 6 and the comparatives 7 through 8, evaluation tests were conducted. The results of them are shown in Table 9 by using a 3-step scale with symbols of o, Δ, and×, wherein o symbol designates good, Δ symbol poor and × not acceptable.

As can be seen from the Table 9, the respective embodiments 2 and 6 show the good mark in both the contact characteristic and the durability, however, neither comparative 7 nor comparative 8 shows a good mark the contact characteristic and the durability.

Thus, it will be understood from Table 9 that the Young's modulus of the under layer 12 needs to be approximately not less than about $2.0 \times 10^{10}$ N/m² to obtain the magnetic tape having a good contact characteristic and the durability.

Next, a description is given to evaluation tests for the light transmittance, electro-magnetic transfer characteristic and the mechanical strength or the embodiments 2 and 6 together with comparatives 9 through 12 of which compositions of the magnetic layer 13 and the under layer 12 are respectively presented in Tables 10 through 13. The evaluation tests were conducted for electro-magnetic transfer characteristics, contact characteristic and durability, taking account of the foregoing conditions required for light blocking characteristic, and the foregoing condition required for electro-magnetic transfer characteristic (i.e, relations between the coercive force Hcs of the under layer and the coercive force Hcj of the magnetic layer).

The results of the evaluation tests are shown together with the above conditions in Table 14.

TABLE 10

Comparative 9

| magnetic paint (W. P.*) | | under layer paint (W. P.*) | |
|---|---|---|---|
| magnetite powder | 300 | iron carbide** | 300 |
| polyvinyl butyral | 40 | polyvinyl butyral | 20 |
| polyurethane resin | 50 | polyurethane resin | 20 |
| $Cr_2O_3$ | 10 | toluene | 200 |
| palmitic acid | 3 | methyl ethyl ketone | 300 |
| toluene | 300 | thickness | 1.0 μm |
| methyl ethyl ketone | 300 | coercive force | $9.5 \times 10^4$ A/m |
| thickness | 2.0 μm | | |
| coercive force | $5.2 \times 10^4$ A/m | | |

*W. P. (Weight Parts)
**plate powder
Note:
no back coating layer is provided

TABLE 11

Comparative 10

| magnetic paint (W. P.*) | | under layer paint |
|---|---|---|
| magnetite powder | 300 | none |
| polyvinyl butyral | 40 | |
| polyurethane resin | 40 | |
| $Cr_2O_3$ | 10 | |
| palmitic acid | 3 | |
| toluene | 300 | |
| methyl ethyl ketone | 300 | |
| thickness | 3.0 μm | |
| coercive force | $5.2 \times 10^4$ A/m | |

*W. P. (Weight Parts)
Note:
no back coating layer is provided

TABLE 12

Comparative 11

| magnetic paint (W. P.*) | | under layer paint (W. P.*) | |
|---|---|---|---|
| $Co$-$\gamma$-$Fe_2O_3$ | 300 | $\alpha$-$Fe_2O_3$** | 300 |
| polyvinyl butyral | 40 | polyvinyl butyral | 20 |
| polyurethane resin | 40 | polyurethane resin | 20 |
| $Cr_2O_3$ | 10 | toluene | 200 |
| palmitic acid | 3 | methyl ethyl ketone | 300 |
| toluene | 300 | thickness | 1.0 μm |
| methyl ethyl ketone | 300 | coercive force | $2.6 \times 10^4$ A/m |
| thickness | 2.0 μm | | |
| coercive force | $5.2 \times 10^4$ A/m | | |

*)W. P. (Weight Parts)
**plate powder
Note:
no back coating layer is provided

TABLE 13

Comparative 12

| magnetic paint (W. P.*) | | under layer paint |
|---|---|---|
| $Co$-$\gamma$-$Fe_2O_3$ | 300 | none |
| polyvinyl butyral | 40 | |
| polyurethane resin | 40 | |
| $Cr_2O_3$ | 10 | |
| palmitic acid | 3 | |
| toluene | 300 | |
| methyl ethyl ketone | 300 | |
| thickness | 3.0 μm | |
| coercive force | $5.2 \times 10^4$ A/m | |

*)W. P. (Weight Parts)
Note:
no back coating layer is provided

TABLE 14

| | cond. 1 coer. for. ($\times 10^4$ A/m) M.L./U.L. | cond. 2 resisti. | cond. 3 light-transm. | evaluation tests | | | |
|---|---|---|---|---|---|---|---|
| | | | | Y-S/N (dB) | C-S/N (dB) | cont. char. | dura. |
| emb. 2 | 5.2/2.6 | o | o | 0 | 0 | o | o |
| com. 9 | 5.2/9.5 | o | o | −0.4 | −1.1 | o | o |
| com. 10 | 5.2/0 | x | o | −1.1 | −1.2 | x | x |
| com. 11 | 5.2/2.6 | o | o | −0.5 | −0.7 | o | o |
| com. 12 | 5.2/0 | x | x | −1.3 | −1.4 | x | x |

In Table 14, condition 1(cond. 1) shows a relation between the coercive force Hcj of the magnetic layer 13 (M.L.) and the coercive force Hcs of the under layer 12 (U.L.), wherein the symbol o designates the magnetic tape 10 satisfying condition 1, i.e., Hcj>Hcs, and the symbol × designates the magnetic tape 10 which does not satisfy the condition 1, i.e., Hcj<Hcs.

In condition 2(cond. 2), the symbol o designates the magnetic tape 10 satisfying the condition 2, i.e. a resistivity of the magnetic layer 13 is not larger than $3.0 \times 10^7$ Ω·mm and the symbol × designates the magnetic tape 10 which does not satisfy the condition 2, i.e., the resistivity of the magnetic layer is larger than $3.0 \times 10^7$ Ω·mm.

In condition 3(cond. 3), the symbol o designates the magnetic tape 10 satisfying the condition 3, i.e., the light transmittance of the magnetic tape 10 is not larger than 0.8% and the symbol × designates the magnetic tape 10 which does not satisfy the condition 3, i.e., the transmittance the magnetic tape 10 is larger than 0.8%.

Further, evaluation tests of electro-magnetic transfer characteristics of the embodiment 2 and the comparatives 9 through 12 were conducted to measure S/N of luminance signal (Y-S/N) and S/X of chrominance signal (C-S/N) by using a VHS system video deck. The evaluation tests of the contact characteristic were also conducted by observing a photographed envelope of output level, and the evaluation tests of the durability were conducted by observing edge damage of the magnetic tape 10 after repealed passes. The results of the evaluation tests were appraised by the 3-step scale as mentioned in the foregoing.

As will be understood from Table 14, the magnetic tape 10 of the embodiment 2 satisfying all the conditions 1 through 3 shows good results of the electro-magnetic transfer characteristics, the contact characteristic and the durability. The comparative 9 which does not satisfy the condition 1, i.e., the coercive force Hcs of the under layer 12 is larger than the coercive force Hcj of the magnetic layer 13, shows lower Y-S/N and C-S/N than those of the embodiment 2.

As to the comparatives 10 and 12, the contact characteristic and the durability characteristic as the mechanical strength are degraded because of the lack of the under layer 12. The comparative 11 does not satisfy the conditions 2, 3, so that it is degraded of the light blocking characteristic and of the electric conduction characteristic.

According to the embodiment 2 of the present invention, it is possible to obtain the magnetic tape which requires no back coating layer 14 by causing the coercive force of the magnetic layer to be larger than that of the under layer and by limiting the Young's modulus and the resistivity of the under layer and limiting the light transmittance off the magnetic layer.

[Embodiments 3 and 4]

Next, a description is given to embodiments 3 and 4.

The embodiments 3 and 4 were respectively constructed in the same manner as the embodiment 1 as shown in FIG. 1. The compositions of the magnetic paints used for the magnetic layers 13 and of the under layer paints used the under layers 12 of the embodiment 3 and 4 are respectively shown in Table 15 and 16.

In the embodiments 3 and 4, metal particles (powder) were employed in the magnetic paints as the magnetic particles used in the magnetic layers 13, and iron carbide (place powder) and α-$Fe_2O_3$(plate powder) were respectively employed in the under layer paint as magnetic plate-particles (powder) used in the under layer 12.

Each of the magnetic tapes of the embodiments 3 and 4 was constructed for a DAT (digital audio tape system using rotating head )type magnetic tape in such a manner that, at first, the above under layer paint and the magnetic paint were coated on a surface of a wide PET (polythylene terephthalete) film having thickness of 6 μm of which opposite surface was provided with the back coating layer 14 having thickness of 0.5 μm, then, the wide PET film was slit to obtain the magnetic tape having width of 0.150 inch.

The compositions of the magnetic paint and the under layer paint of the comparatives 13 through 15 are also respectively shown in Tables 17 through 19.

TABLE 15

Embodiment 3

| magnetic paint (W. P.*) | | under layer paint (W. P.*) | |
|---|---|---|---|
| metal powder | 300 | α-$Fe_2O_3$** | 300 |
| polyvinyl butyral | 40 | polyvinyl butyral | 20 |
| polyurethane resin | 40 | polyurethane resin | 20 |
| | | toluene | 200 |
| $Cr_2O_3$ | 10 | methyl ethyl ketone | 300 |
| palmitic acid | 3 | thickness | 1.0 μm |
| toluene | 300 | coercive force | $0.60 \times 10^5$ A/m |
| methyl ethyl ketone | 300 | | |
| thickness | 1.5 μm | | |
| coercive force | $1.19 \times 10^5$ A/m | | |

*)W. P. (Weight Parts)
**plate powder
Note:
thickness of the back coating layer is 0.5 μm

TABLE 16

Embodiment 4

| magnetic paint (W. P.*) | | under layer paint (W. P.*) | |
|---|---|---|---|
| metal powder | 300 | iron carbide** | 300 |
| polyvinyl butyral | 40 | polyvinyl butyral | 20 |
| polyurethane resin | 40 | polyurethane resin | 20 |
| | | toluene | 200 |
| $Cr_2O_3$ | 10 | methyl ethyl ketone | 300 |
| palmitic acid | 3 | thickness | 1.0 μm |
| toluene | 300 | coercive force | $0.60 \times 10^5$ A/m |
| methyl ethyl ketone | 300 | | |
| thickness | 1.5 μm | | |
| coercive force | $1.19 \times 10^5$ A/m | | |

*)W. P. (Weight Parts)
**plate powder
Note:
thickness of the back coating layer is 0.5 μm

TABLE 17

Comparative 13

| magnetic paint (W. P.*) | | under layer paint (W. P.*) | |
|---|---|---|---|
| metal powder | 300 | α-$Fe_2O_3$** | 300 |
| polyvinyl butyral | 40 | polyvinyl butyral | 20 |
| polyurethane | 40 | polyurethane resin | 20 |

TABLE 17-continued

Comparative 13

| magnetic paint (W. P.*) | | under layer paint (W. P.*) | |
|---|---|---|---|
| resin | | toluene | 200 |
| $Cr_2O_3$ | 10 | methyl ethyl ketone | 300 |
| palmitic acid | 3 | thickness | 1.0 μm |
| toluene | 300 | coercive force | $1.19 \times 10^5$ A/m |
| methyl ethyl ketone | 300 | | |
| thickness | 1.5 μm | | |
| coercive force | $1.19 \times 10^5$ A/m | | |

*)W. P. (Weight Parts)
**plate powder
Note:
thickness of the back coating layer is 0.5 μm

TABLE 18

Comparative 14

| magnetic paint (W. P.*) | | under layer paint (W. P.*) | |
|---|---|---|---|
| metal powder | 300 | α-$Fe_2O_3$** | 300 |
| polyvinyl butyral | 40 | polyvinyl butyral | 20 |
| polyurethane resin | 40 | polyurethane resin | 20 |
| | | toluene | 200 |
| $Cr_2O_3$ | 10 | methyl ethyl ketone | 300 |
| palmitic acid | 3 | thickness | 1.0 μm |
| toluene | 300 | coercive force | $0.5 \times 10^5$ A/m |
| methyl ethyl ketone | 300 | | |
| thickness | 1.5 μm | | |
| coercive force | $1.19 \times 10^5$ A/m | | |

*)W. P. (Weight Parts)
**acicular powder
Note:
thickness of the back coating layer is 0.5 μm

TABLE 19

Comparative 15

| magnetic paint (W. P.*) | | under layer paint |
|---|---|---|
| metal powder | 300 | none |
| polyvinyl butyral | 40 | |
| polyurethane resin | 40 | |
| $Cr_2O_3$ | 10 | |
| palmitic acid | 3 | |
| toluene | 300 | |
| methyl ethyl ketone | 300 | |
| thickness | 2.0 μm | |
| coercive force | $1.19 \times 10^5$ A/m | |

*)W. P. (Weight Parts)
Note:
thickness of the back coating layer is 0.5 μm

In Table 20, condition 1(cond. 1) shows a Young's modulus (Young. m.) of the under layer 12 in the longitudinal direction of the magnetic tape 10, wherein the symbol o designates the magnetic tape 10 satisfying the condition 1, i.e., the Young's modulus is not less than $2.0 \times 10^{10}$ N/m², and the symbol×designates the magnetic tape 10 which does not satisfy the condition 1, i.e, the Young's modulus is equal or less than $2.0 \times 10^{10}$ N/m².

TABLE 20

| | cond. 1 | cond. 2 coer. for. | evaluation tests | | |
|---|---|---|---|---|---|
| | Young. m. (N/m²) | (×10⁵ A/m) M.L./U.L. | signal output | contact char. | durability |
| emb. 3 | $6.0 \times 10^{10}$ o | 1.19/0.60 o | o | o | o |
| emb. 4 | $3.0 \times 10^{10}$ o | 1.19/0.60 o | o | o | o |
| com. 13 | $6.0 \times 10^{10}$ o | 1.19/1.19 x | Δ | o | o |
| com. 14 | $2.0 \times 10^{10}$ o | 1.19/0.50 o | Δ | Δ | o |
| com. 15 | none | none | Δ | x | x |

In the condition 2(cond. 2), the symbol o designates the magnetic tape satisfying the condition 2, i.e., the coercive force Hcs of the under layer 12 is as follows:

$Hcj > Hcs \rightarrow o$

In condition 2(cond. 2), the symbol×designates the magnetic tape which dose not satisfy the condition 2, i.e., the coercive force Hcs of the under layer 12 is as follows:

$Hcj \leq Hcs \rightarrow x$

The evaluation tests were conducted by using a DAT deck of such evaluation items as a signal output (RF) characteristic, and the contact characteristic (contact char.) by observing photographed envelopes of the signal output and durability observing the edge damage of the magnetic tape after repeated passes of the magnetic tape, wherein 3-step scale was employed as follows:

o→good
Δ→poor
×→not acceptable

As is clear from Table 20, the respective embodiments 3 and 4 show good results regarding all the evaluation items.

The comparative 13 does not satisfy the condition 2 because the under layer 12 has the same coercive force Hcs as the coercive force Hcj of the magnetic layer. Thus, signal output characteristic of the comparative 13 is slightly degraded because the magnetic charge in the under layer 12 does not exert effectively. As to the comparative 14, the signal output characteristic and the contact characteristic are degraded because the acicular particles are employed in the under layer 12 as the magnetic particles. In the comparative 15, the contact characteristic and the durability are degraded very much because of an absence of the under layer 12.

According to the embodiments 3 and 4 or the present invention, it is possible to obtain a thin magnetic tape used for the DAT of a long play by employing magnetic metal particles as the magnetic particles in the magnetic layer and by causing the coercive force of the under layer to be larger than that of the magnetic layer and by limiting the Young's modulus of the under layer.

[Embodiment 5 ]

In this embodiment 5, as magnetic particles (powder) of the magnetic layer 13, there employed hexagonal plate powder, made of barium ferrite (Ba—Fe) magnetic particles, which is well known to be used for a recording medium in a perpendicular magnetic recording for high density recording.

Table 21 shows compositions of a magnetic paint used for the magnetic layer 13 and an under layer paint used for the under layer 12 or the embodiment 5.

Table 22 shows compositions of a magnetic paint used for the magnetic layer 13 of the comparative 16, wherein the under layer 12 is not employed.

Table 23 shows compositions of a magnetic paint used for the, magnetic layer 13 and an under layer paint used for an under layer 12 of the comparative 17, wherein Ba—Fe used for the magnetic layer 13 is replaced with Co-γFe$_2$O$_3$.

Table 24 shows a composition of a magnetic paint used for the magnetic layer 13 of the comparative 18, wherein Ba—Fe used for the magnetic layer 13 is replaced with Co-γFe$_2$O$_3$ and the under layer 12 is not employed.

After above magnetic paint and under layer paint were coated on a wide PET base film (11) having thickness of 10 μm, the wide PET base film was slit to obtain a VHS magnetic tape having a width of ½ inch.

TABLE 21

Embodiment 5

| magnetic paint (W. P.*) | | under layer paint (W. P.*) | |
| --- | --- | --- | --- |
| Ba—Fe powder | 300 | α-Fe$_2$O$_3$** | 300 |
| polyvinyl butyral | 40 | polyvinyl butyral | 20 |
| polyurethane resin | 40 | polyurethane resin | 20 |
| Cr$_2$O$_3$ | 10 | toluene | 200 |
| palmitic acid | 3 | methyl ethyl ketone | 300 |
| toluene | 300 | thickness | 1.0 μm |
| methyl ethyl ketone | 300 | coercive force | 2.6 × 10$^4$ A/m |
| thickness | 2.0 μm | | |
| coercive force | 5.2 × 10$^4$ A/m | | |

*)W. P. (Weight Parts)
**plate powder
Note:
no back coating layer is provided

TABLE 22

Comparative 16

| magnetic paint (W. P.*) | | under layer paint |
| --- | --- | --- |
| Ba—Fe powder | 300 | none |
| polyvinyl butyral | 40 | |
| polyurethane resin | 40 | |
| Cr$_2$O$_3$ | 10 | |
| palmitic acid | 3 | |
| toluene | 300 | |
| methyl ethyl ketone | 300 | |
| thickness | 2.0 μm | |
| coercive force | 5.2 × 10$^4$ A/m | |

*)W. P. (Weight Parts)
Note:
no back coating layer is provided

TABLE 23

Comparative 17

| magnetic paint (W. P.*) | | under layer paint (W. P.*) | |
| --- | --- | --- | --- |
| Co-γFe$_2$O$_3$ | 300 | α-Fe$_2$O$_3$** | 300 |
| polyvinyl butyral | 40 | polyvinyl butyral | 20 |
| polyurethane resin | 40 | polyurethane resin | 20 |
| Cr$_2$O$_3$ | 10 | toluene | 200 |
| palmitic acid | 3 | methyl ethyl ketone | 300 |
| toluene | 300 | thickness | 1.0 μm |

TABLE 23-continued

Comparative 17

| magnetic paint (W. P.*) | | under layer paint (W. P.*) | |
| --- | --- | --- | --- |
| methyl ethyl ketone | 300 | coercive force | 2.6 × 10$^4$ A/m |
| thickness | 2.0 μm | | |
| coercive force | 5.2 × 10$^4$ A/m | | |

*)W. P. (Weight Parts)
**plate powder
Note:
no back coating layer is provided

TABLE 24

Comparative 18

| magnetic paint (W. P.*) | | under layer paint |
| --- | --- | --- |
| Co-γFe$_2$O$_3$ | 300 | none |
| polyvinyl butyral | 40 | |
| polyurethane resin | 40 | |
| Cr$_2$O$_3$ | 10 | |
| palmitic acid | 3 | |
| toluene | 300 | |
| methyl ethyl ketone | 300 | |
| thickness | 2.0 μm | |
| coercive force | 5.2 × 10$^4$ A/m | |

*)W. P. (Weight Parts)
Note:
no back coating layer is provided

TABLE 25

| | evaluation tests | |
| --- | --- | --- |
| samples | contact char. | durability |
| embodiment 5 | o | o |
| comparative 16 | x | x |
| comparative 17 | o | Δ |
| comparative 18 | x | x |

The evaluation tests were conducted regarding frequency characteristic and both the contact characteristic by observing photographed envelopes of signal output and the durability of the magnetic tape by observing the damage of the magnetic tape 10 after repeated passes.

Figure 2:
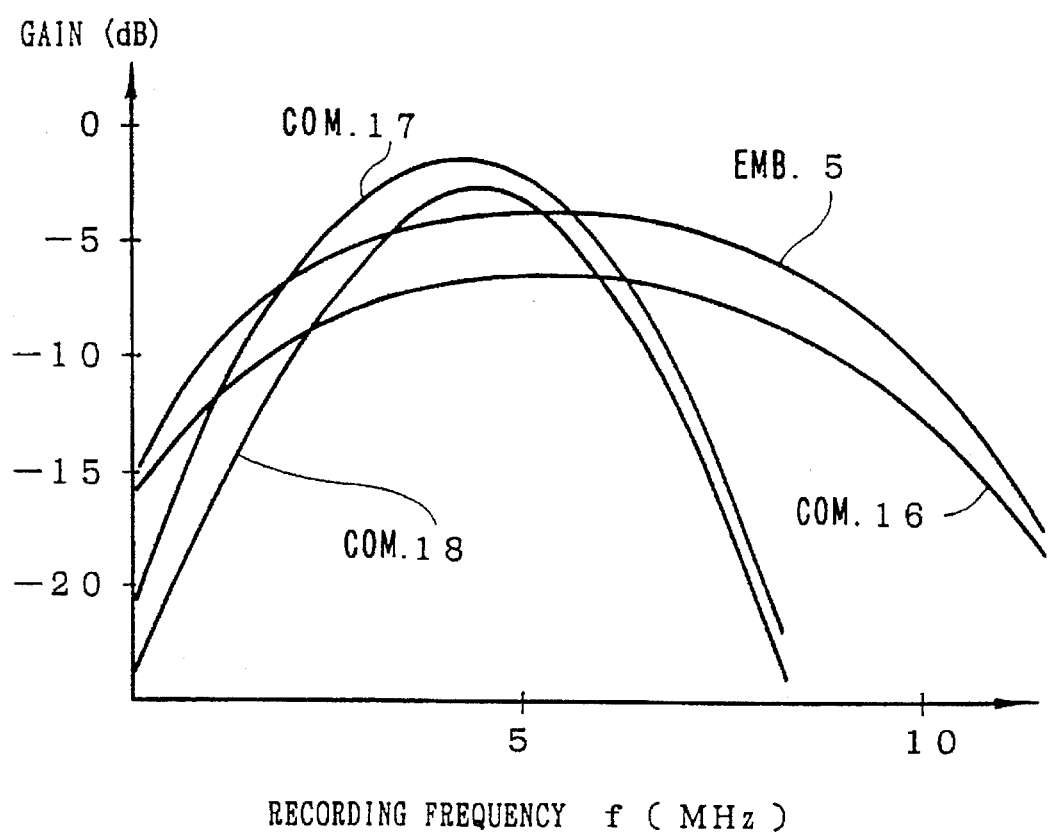
FIG. 2 is a graph showing a frequency characteristic of the embodiment 5 and the comparatives 16 through 18.

The results of frequency characteristics of the embodiment 5 and the comparatives 16 through 18 are shown in FIG. 2 and the results of the contact characteristic and the durability are shown in Table 25, wherein 3-step scale (o, Δ, ×) is employed as in the embodiments 3 and 4.

FIG. 2 is a graph showing frequency characteristics of the embodiment 5 and the comparatives 16 through 18.

Referring to FIG. 2, both the embodiment 5 and the comparative 16 show better frequency characteristics than those of the comparatives 17 and 18 because both the embodiment 5 and comparative 16 employ Ba—Fe magnetic particles (powder) in the magnetic layer 13 and, on the other hand, the comparatives 17 and 18 employ Co-γFe$_2$O$_3$ magnetic particles (powder) in the magnetic layer 13. Further, since the embodiment 5 is provided with the under layer 12 containing magnetic palate powder, the frequency characteristic of the embodiment 5 is improved by 3~5dB in the middle frequency range and by 1~3 dB in the high frequency range in comparison with those of the comparative 16 which is not provided with the under layer 12.

As is clear from Table 25, it is also verified that the embodiment 5 which is provided with the under layer 12 containing magnetic plate powder, shows good results of the head-tape contact characteristic and the durability.

According to the embodiment 5 of the present invention, it is possible to obtain a thin magnetic tape for high density magnetic recording by employing the hexagonal plate particles, each having an easy axis of magnetization in the perpendicular direction to the hexagonal plate, as the magnetic particles to be included in the magnetic layer together with the magnetic plate-particles included in the under layer.

In the embodiments 1 through 8, the magnetic plate-particles used in the under layer 12 have configurations such that a ratio of an average major axis to an average minor axis observed in a plane of the magnetic plate-particles is 1~1.5, and a ratio of the average major axis to an average thickness of the magnetic plate-particles is 5~10 as mentioned in the foregoing.

What is claimed is:

1. A magnetic recording tape having a longitudinal and traversing direction used for a magnetic recording and/or reproducing apparatus comprising:

a non-magnetic substrate;

an under layer provided on the non-magnetic substrate, said under layer containing a composite of flattened magnetic particles and binder, each of said flattened magnetic particles having a planar surface with a first easy axis of magnetization parallel to said planar surface, a major axis defined as a first distance vector having the longest dimension between any pair of parallel tangential lines contacting the periphery of said planar surface and a minor axis defined as a second distance vector having the shortest dimension between any pair of tangential lines contacting the periphery of said planer surface and having a ratio T1 of an average of said major axis to an average of said minor axis being of $1 \leq T1 \leq 1.5$ so as to enhance the mechanical strength of the magnetic recording tape in both the traversing and longitudinal directions of said major axis to an average of the thickness of said flattened magnetic particles in the range of $5 \leq T2 \leq 10$, said under layer having a Young's modulus of not less than $2.0 \times 10^{10}$ N/m$^2$ in the longitudinal direction of said magnetic recording tape and having a coercive force "HCS" as defined in an inequality (1) to enhance electromagnetic transfer characteristics of the magnetic recording tape;

$$1.5 \times 10^4 A/m < Hcs < 8.0 \times 10^4 A/m \quad (1)$$

and, a magnetic layer provided on said under layer for recording signal information, said magnetic layer containing binder and magnetic acicular particles each having a second easy axis of magnetization in the longitudinal direction of said magnetic acicular particles, wherein each of both, said flattened magnetic particles and said magnetic acicular particles is disposed in said under layer and magnetic layer, respectively, in such a manner that said first easy axis of magnetization and said second easy axis of magnetization are respectively oriented in the longitudinal direction of said magnetic recording tape so as to form magnetic flux coupling between said first and second easy axes of magnetization.

2. A magnetic recording tape as claimed in claim 1, wherein said magnetic acicular particles are made of $\gamma$-Fe$_2$O$_3$.

3. A magnetic recording tape as defined in claim 1, wherein said planar surfaces of said flattened magnetic particles are disposed in said under layer with the planar surfaces securely disposed in a direction parallel to a surface of said non-magnetic substrate.

4. A magnetic recording tape having a longitudinal and traversing direction used for a magnetic recording and/or reproducing apparatus comprising:

a non-magnetic substrate;

an under layer provided on the non-magnetic substrate, said under layer containing a composite of flattened magnetic particles and binder, each of said flattened magnetic particles having a planar surface with a first easy axis of magnetization parallel to said planar surface, a major axis defined as a first distance vector having the longest dimension between any pair of parallel tangential lines contacting the periphery of said planar surface and a minor axis defined as a second distance vector having the shortest dimension between any pair of tangential lines contacting the periphery of said planar surface and having a ratio T1 of an average of said major axis to an average of said minor axis of $1 \leq T1 \leq 1.5$ so as to enhance mechanical strength of the magnetic recording tape in both the longitudinal and transversing directions of said magnetic recording tape and a ratio T2 of the average of said major axis to an average of the thickness of said flattened magnetic particles in a range of $5 \leq T2 \leq 10$, said under layer having a Young's modulus of not less than $2.0 \times 10^{10}$ N/m$^2$ in a longitudinal direction of said magnetic recording tape and having a coercive force "Hcs"; and a magnetic layer provided on said under layer for recording signal information, said magnetic layer containing binder and magnetic acicular particles each having a second easy axis of magnetization in the longitudinal direction of said magnetic acicular particles, said magnetic layer having a coercive force Hcj, wherein each of both said flattened magnetic particles and said magnetic acicular particles is disposed in said under layer and magnetic layer, respectively, in such a manner that said first easy axis of magnetization and said second easy axis of magnetization are oriented in the longitudinal direction of said magnetic recording tape so as to form magnetic flux coupling between said first and second easy axes of magnetization, and said coercive force Hcj of said magnetic layer is larger than said coercive force Hcs of said under layer so as to enhance electromagnetic transfer characteristics of the magnetic recording tape.

5. A magnetic recording tape as claimed in claim 4, wherein a resistivity of said magnetic layer is less than $3.0 \times 10^7$ $\Omega \cdot$mm and a light transmittance of said magnetic recording tape for a white light is less than 0.8%.

6. A magnetic recording tape as claimed in claim 4, wherein said magnetic acicular particles of the magnetic layer are made of magnetite.

7. A magnetic recording tape as claimed in claim 4, wherein said magnetic acicular particles of the magnetic layer are made of metal particles.

8. A magnetic recording tape as defined in claim 4, wherein said planar surfaces of said flattened magnetic particles are disposed in said under layer with the planar surfaces securely disposed in a direction parallel to a surface of said non-magnetic substrate.

9. A magnetic recording tape having a longitudinal and traversing direction used for a magnetic recording and/or reproducing apparatus comprising:

a non-magnetic substrate;

an under layer provided on the non-magnetic substrate, said under layer containing a composite of flattened magnetic particles and binder, each of said flattened magnetic particles having a planar surface with an easy axis of magnetization parallel to said planar surface, a major axis defined as a first distance vector having the longest dimension between any pair of parallel tangential lines contacting the periphery of said planar surface and a minor axis defined as a second distance vector having the shortest dimension between any pair of tangential lines contacting the periphery of said planar surface and having a ratio T1 of an average of said major axis to an average of said minor axis of $1 \leq T1 \leq 1.5$ so as to enhance the mechanical strength of the magnetic recording tape in both the longitudinal and transversing directions of said magnetic recording tape and a ratio T2 of the average of said major axis to an average of the thickness of said flattened magnetic particles in the range of $5 \leq T2 \leq 10$, said under layer having a Young's modulus of not less than $2.0 \times 10^{10}$ N/m$^2$ in the longitudinal direction of said magnetic recording tape; and a magnetic layer provided on said under layer for recording signal information, said magnetic layer containing binder and magnetic hexagonal plate-shaped particles each having an easy axis of magnetization in a perpendicular direction to the plate surface of said hexagonal plate-shaped particles, wherein each of said flattened magnetic particles is disposed in said under layer in such a manner that said easy axis of magnetization of said flattened magnetic particles is oriented in the longitudinal direction of said magnetic recording tape.

10. A magnetic recording tape as claimed in claim 9, wherein said magnetic hexagonal plate-shaped particles are made of barium ferrite.

11. A magnetic recording tape as defined in claim 9, wherein said planar surfaces of said flattened magnetic particles are disposed in said under layer with the planar surfaces securely disposed in a direction parallel to a surface of said non-magnetic substrate.

* * * * *